United States Patent [19]

Yonehara

[11] Patent Number: 5,425,334
[45] Date of Patent: Jun. 20, 1995

[54] OLDHAM DRIVE ENGINE

[75] Inventor: Ryoichi Yonehara, Shimane, Japan

[73] Assignee: Yonehara Giken Co., Ltd, Shimane, Japan

[21] Appl. No.: 182,157

[22] PCT Filed: Aug. 3, 1992

[86] PCT No.: PCT/JP92/00989
§ 371 Date: Feb. 1, 1994
§ 102(e) Date: Feb. 1, 1994

[87] PCT Pub. No.: WO93/03265
PCT Pub. Date: Feb. 18, 1993

[30] Foreign Application Priority Data

Aug. 2, 1991 [JP] Japan .................. 3-216177

[51] Int. Cl.$^6$ .................................................. F01B 9/04
[52] U.S. Cl. ...................................................... 123/197.1
[58] Field of Search ............................................ 123/197.1

[56] References Cited

U.S. PATENT DOCUMENTS

| | | | |
|---|---|---|---|
| 3,563,222 | 2/1971 | Ishida | 123/197.1 |
| 4,073,196 | 2/1978 | Dell | 123/197.1 |
| 4,970,995 | 11/1990 | Parsons | 123/197.1 |

FOREIGN PATENT DOCUMENTS 1-240701 9/1989 Japan .
1-247708 10/1989 Japan .

Primary Examiner—David A. Okonsky
Attorney, Agent, or Firm—Nikaido, Marmelstein, Murray & Oram

[57] ABSTRACT

There is disclosed an Oldham's driving engine for taking out the maximum combustion pressure effectively from a top dead center in a piston engine as output for revolving an output shaft 17. A sliding block 11 is interposed between both flanges 8 and 9 to constitute an Oldham's coupling mechanism. One flange 8 is constituted as an idler flange 8, the other flange is constituted as an output flange 9, and an output end of a piston rod 4 is connected to the center of the sliding block 11. Further, a center line $B_2$ of both the flanges 8 and 9 is placed at a phase angle $\theta$ with the axial center $B_1$ of the cylinder in the reversed rotational direction of the sliding block 11. Furthermore, a plurality of engines described above are placed side by side and connected to each other, and the idler flange 8 rotated in linkage with the sliding block 11 is axially supported to the inside of each engine case 7 between the mutually adjacent engine cases 7, so that a multiple cylinder engine can also be constituted for providing the output from each piston together to the output shaft of the engine case 7 of the engine arranged at the final end.

2 Claims, 7 Drawing Sheets

OLDHAM DRIVE ENGINE

TECHNICAL FIELD

This invention relates to an engine for transmitting pressure received by a piston within a cylinder to an output shaft as effectively as possible in a piston engine, and more particularly to an Oldham's driving engine for allowing large expansion energy at the moment when the piston is moved from a top dead center toward a bottom dead center to output effectively as the torque for revolving the output shaft.

PRIOR ART

As for an engine which has been practically in wide use in a prior art, a piston engine for transmitting the reciprocating motion of a cylinder to a crankshaft as a rotational motion through a rod and a crank, and a rotary engine having a combustion chamber provided around a rotor to rotate directly the rotor have been known. However, the rotary engine is only used for one having special specifications by reason of high fuel cost or the like, although an output shaft is revolved smoothly to result in sufficient output efficiency.

On the other hand, in the prior art piston engine, it has been known from the combustion-dynamical point of view that the pressure in the cylinder becomes maximum at the time of an explosion under the condition that the piston is located at the top dead center position, and that the pressure is rapidly reduced immediately after the starting of a piston operation after the explosion.

However, when the piston is located at the top dead center position, a piston rod and a crank arm are in a rectilinearly connected state on the axial center of the cylinder. In this state, it is mechanically impossible to convert the extrusion energy of the piston rod into the rotation energy of the crank arm. In order to compensate for such disadvantages, a flywheel is mounted on the side of a crankshaft. However, such a problem as the energy transmission efficiency of the maximum combustion pressure immediately after the explosion is extremely bad remains unsolved.

It is an object of the present invention to provide an Oldham's driving engine for taking out the maximum combustion pressure in the neighborhood of a top dead center of a piston to an output shaft effectively so as to dissolve the problems described above.

DISCLOSURE OF THE INVENTION

The present invention relates to an engine constituted such that a cylinder for allowing a piston connected to the tip end of a rod to insert thereinto is fixed to a case for rotatably and axially supporting an output shaft revolved in linkage with the reciprocating motion of the basal end of the rod.

A flange,shaped sliding block is accommodated in the case, and connected to the end of the rod as being rotatably and axially supported thereto. An idler flange rotatably and axially supported to the inside surface of the case and an output flange fixed to the output shaft are provided on both sides of the sliding block through a certain distance between the axes of both the idler flange and the output flange. Also, irregular stripes slidably fitted to each other and alternately crossing are formed on both surfaces of the sliding block and the inside surfaces of both the idler flange and the output flange.

According to the engine of the present invention constituted as described above, high driving force of the piston is obtained at the slight moment when the combustion pressure becomes maximum at the time of combustion at the top dead center position of the piston in the piston engine, and then the obtained high driving force can be transmitted to the output side at the efficiency extremely higher than that in case of using a prior art crankshaft. As a result, the amount of energy to be taken out to the output side becomes also large, and the output shaft can be smoothly revolved as well.

Further, since the revolving speed of the output shaft with respect to the piston driving force is reduced to half in comparison with that of a crankshaft type, a speed reducing mechanism can be omitted by the corresponding part.

Furthermore, according to the engine of the present invention, the axial center of the idler flange and that of the output flange are arranged to be symmetrical in rotation to the axial center of the cylinder, and a straight line interconnecting the axial centers of both the flanges is placed at a certain phase angle with the axial center of the cylinder in the reversed rotational direction of the sliding block. As a result, the force for revolving the output shaft can be transmitted to the output shaft most efficiently from the moment when the piston is started from the top dead center. Therefore, the explosion engine in the cylinder can be outputted effectively.

Furthermore, the engine according to the present invention can be also constituted such that a plurality of combinations of the cylinder and the case are placed side by side, then connected and fixed to each other, the idler flange connected to the side surface of the sliding block within each case through the irregular stripes is rotatably and axially supported to a partition portion of the mutually adjacent cases, and the output shaft is provided in the case arranged at the end of a plurality of connected cases.

According to the mechanism described above, the outputs from a plurality of engines are gathered to one output shaft to constitute a multiple cylinder engine, so that a high-powered output can be obtained.

Further, even in the multiple cylinder engine described above, the axial centers of two idler flanges in each case or the axial centers of both the idler flange and the output flange are arranged to be symmetrical in rotation to the axial center of each cylinder, and a straight line interconnecting the axial centers of both the flanges is placed at a certain phase angle with the axial center of the cylinder in the reversed rotational direction of the sliding block, so that an efficient output can be obtained from the moment when the piston is started from the top dead center.

BEST MODE FOR EXECUTING THE INVENTION

Figure 1:
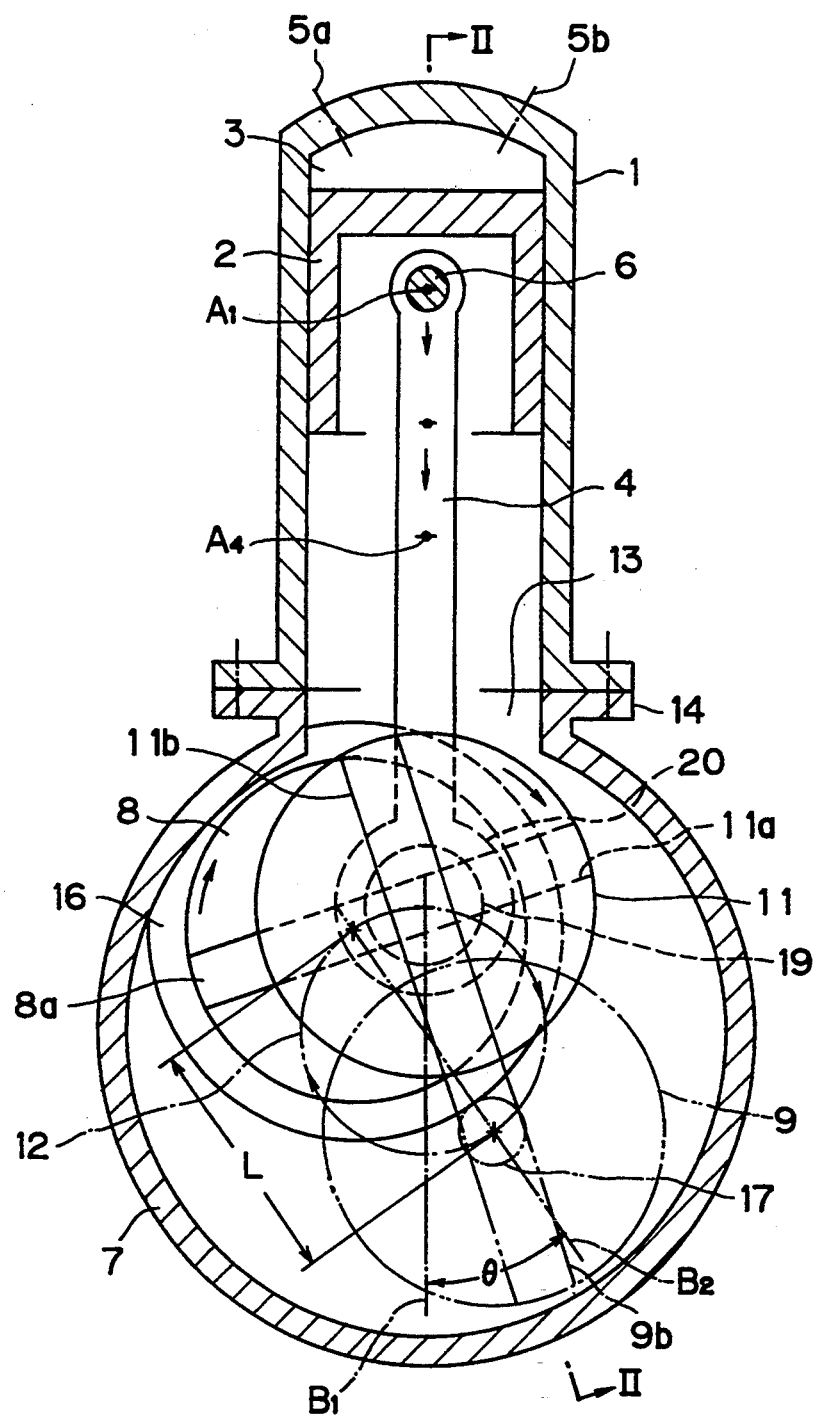
FIG. 1 is a sectional view showing an engine as an embodiment of the present invention.
Figure 2:
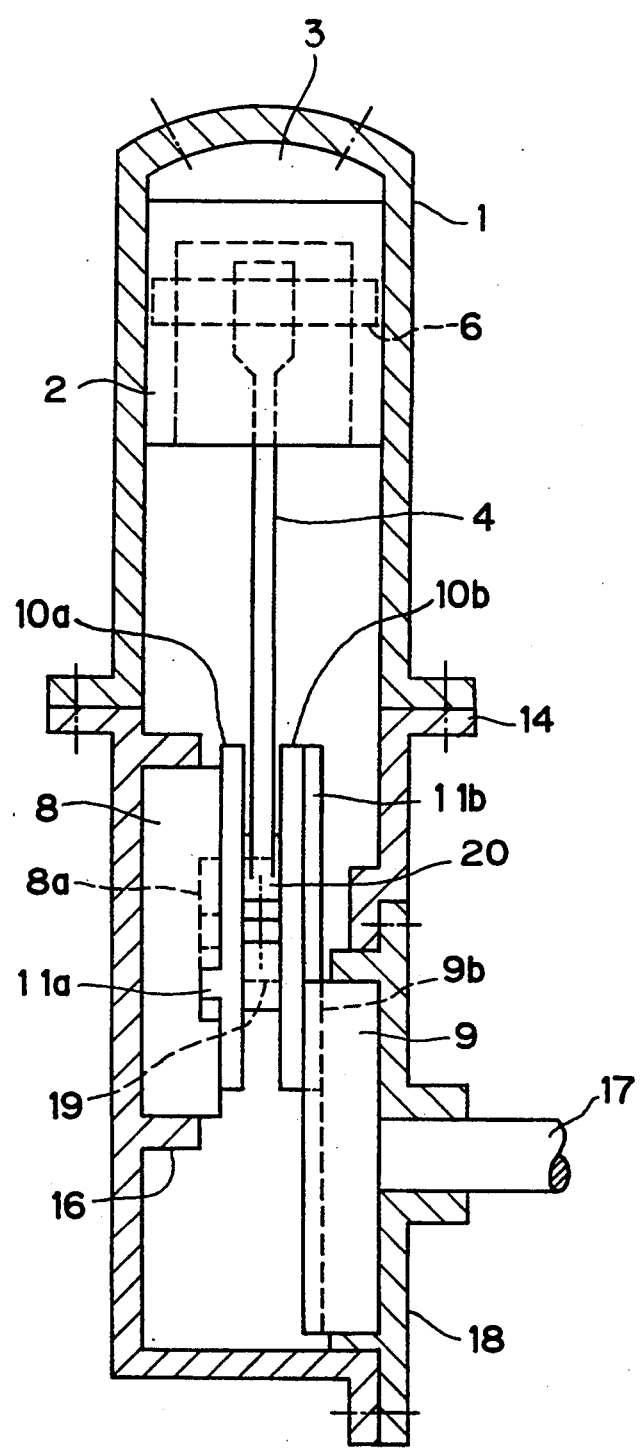
FIG. 2 is a sectional view taken along a line II—II in FIG. 1.
Figure 3:
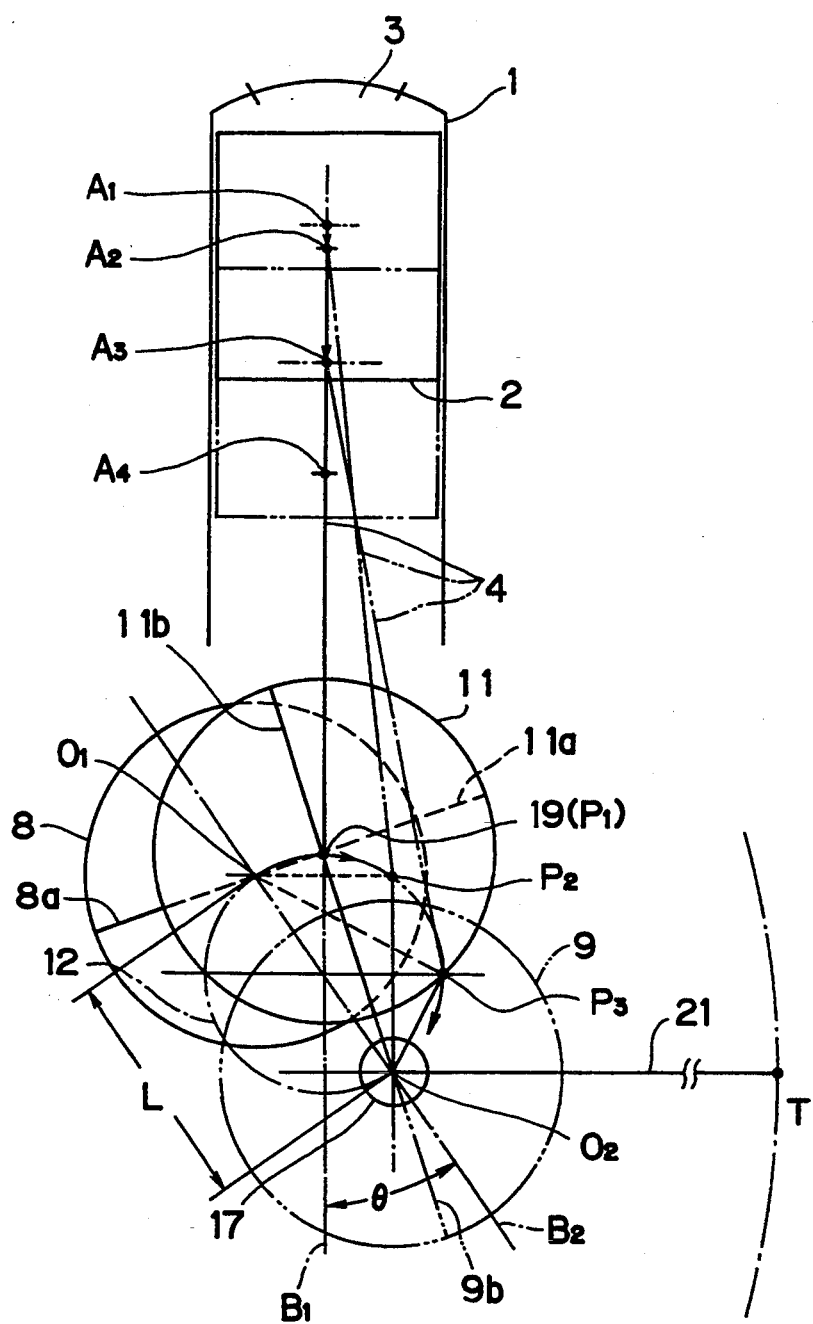
FIG. 3 is a view, partly omitted, for explaining an engine corresponding to that shown in FIG. 1 and a method for measuring the output of the engine.

FIGS. 1 to 3 are views respectively showing the principle structure of an engine as an embodiment of the present invention. In this engine, a piston 2 is inserted into a cylinder 1, a combustion chamber 3 is formed on the side of a cylinder head provided with suction and exhaust ports 5a and 5b, one end of a piston rod 4 is connected to the rear (bottom) side of the piston 2 through a connection shaft 6, and an output end of the rod 4 is inserted into an Oldham's case 7 which will be described in the following.

The Oldham's case 7 has an idler flange, 8, an output flange 9 and a sliding block 11 (which will be described later) built-in. The Oldham's case 7 takes the circular shape when observed from the front so as to have a space enough to rotate (revolve) the sliding block 11 along a circular orbit 12. An upper end of the Oldham's case 7 has a cylindrical opening 13 which is connected to a lower end opening of the cylinder 1 at a flange portion 14 provided on an outer peripheral edge of the opening 13.

The idler flange 8 having a disc shape is fitted and supported to the interior rear side of the Oldham's case 7 rotatably by a bearing portion 16. The output flange 9 is supported to the interior front side of the Oldham's case 7 rotatably and axially by an output shaft 17 such that the output flange 9 is in parallel to the idler flange 8 and located at the position lower than the idler flange 8 through a certain distance L between the axes of both the flanges. Both the output flange 9 and the output shaft 17 are axially supported to a housing 18 used in common for a cap detachably fitted to the front side of the Oldham's case 7. Both the flanges 8 and 9 or the like are axially supported by properly inserting wear-resistant ceramic bearings or any other bearings. When the peripheral surface of each flange works as a sliding surface, an oil line (oil channel) is formed on the peripheral surface.

The sliding block 11 having a spool shape and composed of two circular plates 10a and 10b integrally connected to each other at the center of both the plates by a shaft 19 is inserted between the idler flange 8 and the output flange 9, and a boss 20 provided at the output end of the rod 4 is connected to the shaft 19. Further, the opposed surfaces of both the flanges 8 and 9 and both surfaces of the sliding block 11 are respectively provided with irregular stripes 8a and 11a and irregular stripes 11b and 9b, which respectively pass through the center points of both the flanges and the sliding block and are fitted to each other so as to be slidable in the normal directions thereof. The irregular stripes 8a and 11a and the irregular stripes 11b and 9b take such the cross shape as being orthogonal to each other when observed from the front. The section of each irregular stripe may be either arcuate or rectangular or the like as illustrated in the drawing.

The combination of the idler flange 8, the output flange 9 and the sliding block 11 originally constitutes an Oldham's coupling mechanism that if either of the flanges 8 and 9 rotates, the rotation of either of the flanges 8 and 9 can be transmitted to the other flange through rotation and revolution of the sliding block 11. Then, in this embodiment, when the piston 2 is operated to retreat (descend) due to the generation of combustion pressure under the condition that the piston 2 is located at a top dead center $A_1$ as shown in FIGS. 1 and 2, the sliding block 11 rotates (revolution) clockwise along the circular orbit 12 of the sliding block while rotating (rotation) in the same direction due to the tilting and sliding action of the irregular stripes 8a and 11a and the irregular stripes 11b and 9b. At the same time, both the output flange 9 and the output shaft 17 are driven clockwise. At this time, the idler flange 8 rotates freely, and the output shaft 17 revolves in a half of round by rotating and revolving the sliding block 11 once, so that the revolving speed of the output shaft is reduced to half. In a two cycle engine, for instance, an explosion process is contained twice during one revolution of the output shaft 17.

Further, in the embodiment, the axial centers of both the idler flange 8 and the output flange 9 are arranged to be symmetrical in rotation to the axial center $B_1$ of the cylinder 1, and the center line $B_2$ interconnecting the axes of both the flanges 8 and 9 placed at a certain phase angle $\theta$ (e.g., 35°) with the axial center $B_1$ in the reversed rotational direction of the sliding block 11. Then, the force for revolving the output shaft 17 can be transmitted to the output shaft 17 most efficiently at the moment when the piston 2 is started from the top dead center $A_1$.

In FIG. 3, when the axial centers of both the flanges 8 and 9 are respectively defined as $O_1$ and $O_2$ and the moving points on the revolution orbit 12 of the shaft 19 are respectively defined as $P_1$, $P_2$..., the rotational arms with respect to the output shaft 17 are respectively expressed by $P_1$ to $O_2$ when the piston 2 is located at the top dead center $A_1$. Similarly, when the arbitrary position of the piston 2 immediately after the combustion is defined as $A_2$, the rotational arms to the output shaft are respectively expressed by $P_3$ to $O_2$ in the moving point $P_2$ of the shaft 19 when the piston 2 is located at the position $A_2$. These arm lengths are sequentially varied depending on the rotation and revolution of the sliding block 11. Then, it is apparent that the rotational arm to the output shaft becomes longest when the piston 2 is located at the top dead center $A_1$, and the torque for revolving the output shaft 17 is made smallest at that time as well. Reference symbol $A_4$ designates a bottom dead center position of the piston 2. The shaft 19 is moved to the position, which is on the axial center $B_1$ of the cylinder 1 and at the lowest position of the revolution orbit 12, when the piston 2 is located at the bottom dead center position $A_4$.

In this connection, when the centers $O_1$ and $O_2$ of both the flanges 8 and 9 are located on the axial center $B_1$ of the cylinder (i.e., when any phase angle $\theta$ is not provided), no action for rotating the arms $P_1$ to $O_2$ can be expected at the initial operation time of the piston 2, and it is not preferable as an initial operating position.

Figure 4:
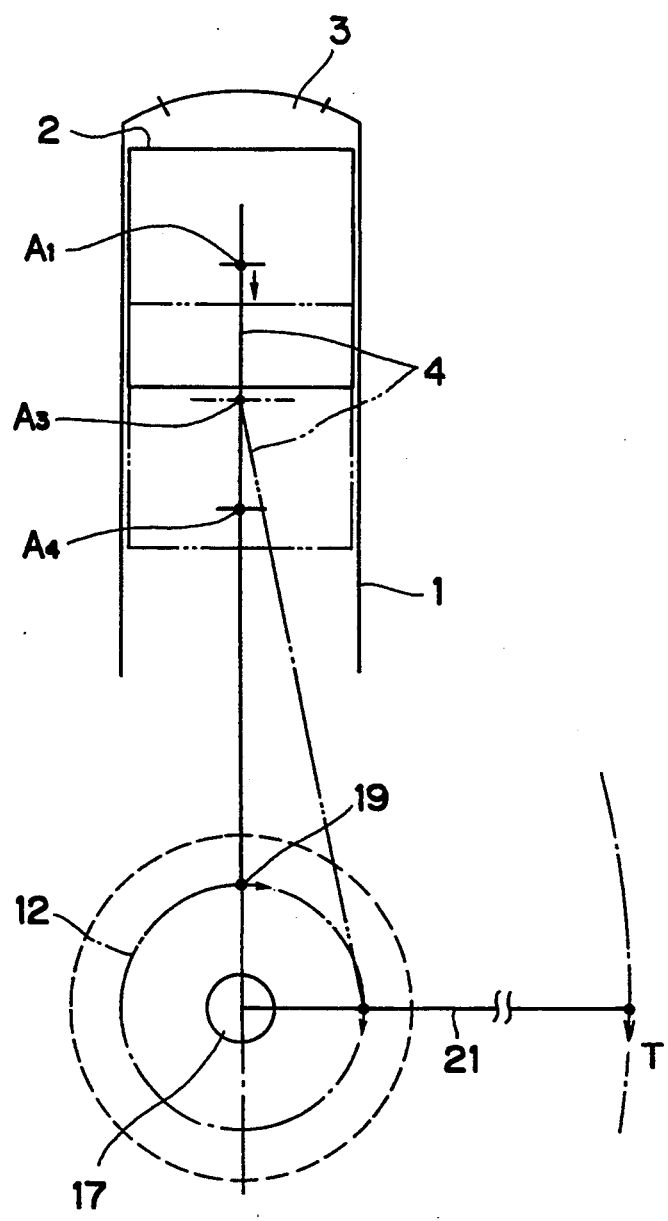
FIG. 4 is a view for explaining a prior art piston engine and a method for measuring the output of the engine.
Figure 5:
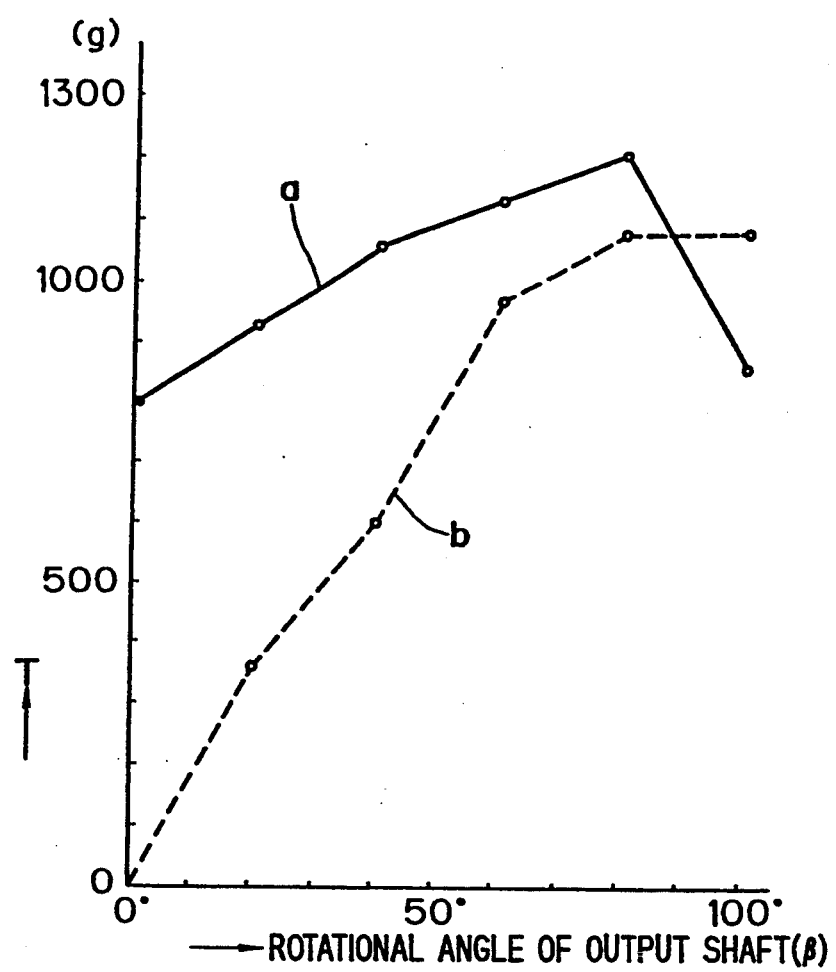
FIG. 5 is a graph showing the comparison of the output of an Oldham's driving engine shown in FIGS. 3 and 4 with that of a prior art piston engine.

FIG. 5 is a graph showing the difference of revolving force of the output shaft 17 by using a mechanism of an engine (FIG. 3) of the embodiment indicated by a symbol a and a mechanism of a prior art piston engine (FIG. 4) indicated by a symbol b on the basis of the measurement and comparison according to a model experiment. Namely, in the experiment of the embodiment, a measurement arm 21 is attached to the output shaft 17 as shown in FIG. 3 to apply a certain load to the piston 2 from above, and the torque T at the tip end of the measurement arm 21 is measured in correspondence to the change of a rotational angle $\beta$ of the arm 21.

FIG. 4 shows a prior art piston engine mechanism. In FIG. 4, the cylinder 1, the piston 2 and the rod 4 or the like are respectively designated by the same reference numerals as the corresponding parts of the engine mechanism in the embodiment described above, and the dimension of each part is made identical to that of the Oldham's driving engine shown in FIGS. 1 to 3.

The measurement conditions in each mechanism described above are as follows:
cylinder bore : 40 mm
piston stroke : 40 mm
length of piston rod : 100 mm
length of measurement arm : 150 mm
pressure (load) applied to piston: 4 Kg (constant)
(Note) The rotational angle of the measurement arm 21 is taken as a variable in any case of the measurement. However, since the revolution ratio of the output shaft 17 is ½ in the embodiment, the same output change is repeated twice during the actual revolution of the output shaft 17. Further, as has been described above, the combustion pressure within the cylinder 1 is rapidly reduced with the piston operation after the combustion, and the output shaft 17 hardly acts on the piston as operating force at the point of time when the rotational angle exceeds 90° after the starting, so that the measurement at the position where the rotational angle of exceeds 100° after the starting of the output shaft 17 will be omitted.

According to the result of measurement, the output efficiency of the piston 2 to the output shaft 17 in the embodiment expressed by the symbol a is extremely high from the moment of the starting, in comparison with the output efficiency of that in the prior art crank type piston engine expressed by the symbol b. When such extremely high output efficiency is continued up to the neighborhood of approximately 90° after the starting of the output shaft, the output efficiency indicated by the symbol a is approximately more or less 1.6 times as large as the output efficiency indicated by the symbol b according to the cumulative output ratio.

In this connection, the measurement described above is made as the result of applying a constant load of 4 Kg to the piston 2. However, in case of the piston engine accompanying the combustion actually, since the combustion pressure shows an abrupt rising from the moment of ignition as described above, all the resultant maximum pressure is effectively converted to the piston driving. Therefore, the difference in the torque yielded in the output shaft 17 immediately after the starting from the actual top dead center of the piston becomes still larger than that shown in FIG. 5.

Figure 6:
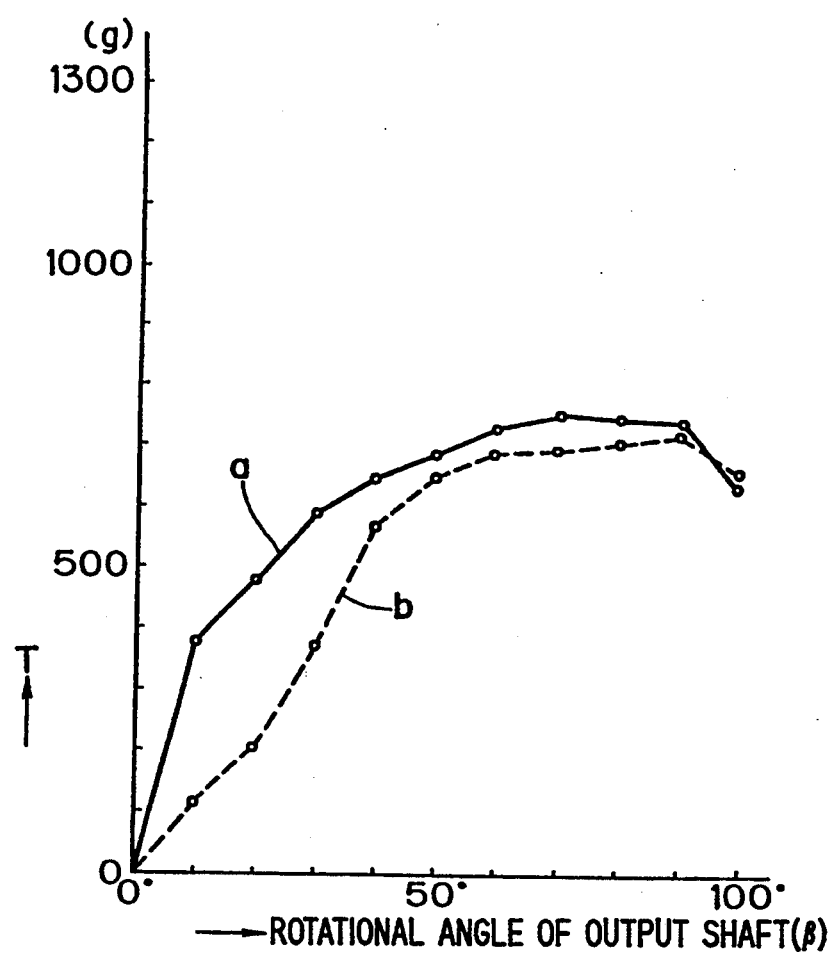
FIG. 6 is a graph showing the comparison of the output of an Oldham's driving engine with that of a prior art piston engine on the basis of an experiment conducted under the conditions different from those in FIG. 5.
Figure 7:
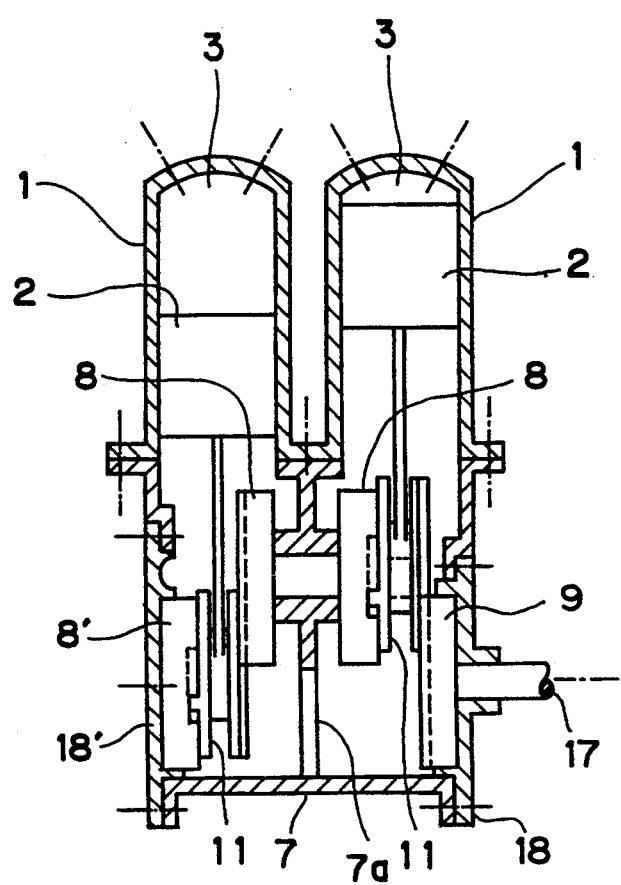
FIG. 7 is a sectional view showing an embodiment in case of constituting a two cylinder engine based on an Oldham's driving engine.

FIG. 6 is a graph on the basis of the measurement and comparison according to a model experiment conducted under the following conditions different from those shown in FIG. 5 (the different conditions are shown by asterisk mark as described below) as the conditions of a mechanism of an engine of the present invention and a mechanism of a prior art piston engine.

cylinder bore : 40 mm
piston stroke : 41 mm
length of piston rod : 100 mm
length of measurement arm : 210 mm
pressure (load) applied to piston: 7 Kg (constant)

When comparing FIG. 5 with FIG. 6, the torque at the time of starting the piston driving from the top dead center of the piston of the Oldham's driving engine (when the rotational angle of the output shaft is 0) is 800 g in case of FIG. 5, while the torque described above is 0 in case of FIG. 6. There is a difference in starting output between the cases in FIGS. 5 and 6. It is to be understood that the difference described above is caused by a slight error in the angle of the irregular stripes of the sliding block or the like at the time of measurement. However, the cases in FIGS. 5 and 6 are quite the same in such points that a highly rising output is provided in comparison with that in case of the prior art piston engine, and the action according to the present invention is excellent.

Incidentally, only the basic structure of the engine is shown in the illustrated embodiment. However, it is a matter of course that a balance weight and a flywheel are desirably mounted on the side of the shaft 19 and the output shaft 17 in order to actually obtain the stable revolving force from the output shaft 17. Further, in the engine of the present invention, the revolving speed of the output shaft 17 to the piston driving is reduced to half in comparison with that in the prior art engine of a crankshaft type. However, the normal engine output is largely reduced at a driving portion for operation. Therefore, there is an advantage in that a speed reducing mechanism can be omitted by the corresponding part, and the engine of the present invention does not offer any practical problem.

FIG. 6 shows an embodiment in case of constituting a two cylinder engine based on the engine of the present invention. In this embodiment, the cylinder 1 and the Oldham's case 7 are continuously provided as shown in the drawing, a spool-shaped flange composed of two flanges 8 and 8 coaxially fixed to each other by a shaft 21 is rotatably and axially supported to a partition 7a within the Oldham's case 7, and both the sliding blocks 11 are connected to the flange. A housing 18 is mounted on the Oldham's case 7 on the left side in the drawing to axially support an idler flange 8, and the revolving force of the sliding block 11 on the left side is transmitted to the output shaft 17 through the flange 8, the sliding block 11 on the right side and the flange 9. The piston 2 on the left side is provided at such a position as smooth revolving force can be yielded in the most efficient phase to the piston 2 on the right side. Further, it is also possible to increase the number of cylinders to constitute a multiple cylinder engine.

INDUSTRIAL POSSIBILITY OF UTILIZATION

As described above, the Oldham's driving engine of the present invention can be utilized as a prime mover in a wide field similarly to the case of a prior art crank type piston engine and a rotary engine. For instance, the engine of the present invention can be utilized as an engine for automobiles, various kinds of working machines, working vehicles and generators or the like.

I claim:
1. An Oldham's driving engine comprising a cylinder having an axial center line, a piston slidably positioned in said cylinder, a rod having a tip end connected to said piston and a basal end, an output shaft, a case rotatably and axially supporting said output shaft for rotation in linkage with reciprocating motion of said basal end of said rod, a sliding block accommodated in said case and connected to and rotatably and axially supported on said basal end of said rod, an idler flange rotatably and axially supported on an inside surface of the case an output flange fixed to the output shaft and rotatably and axially supported on another inside surface of the case, said idler flange and said output flange being provided on both sides of said sliding block through a certain distance between rotational axes of both flanges, and irregular stripes slidably fitted to each other and alternately crossing provided on both surfaces of said sliding block and on inside surfaces of both said idler flange and said output flange, wherein an axial center of said idler flange and an axial center of said output flange are arranged to be symmetrical in rotation to said axial center line of said cylinder; and a straight line interconnecting said axial centers of both said flanges is placed at a predetermined phase angle with said axial center line of said cylinder in the reversed rotational direction of said sliding block.

2. An Oldham's driving engine according to claim 1, wherein a plurality of combinations of said cylinder and said case are placed side by side, then connected and fixed to each other, said idler flange within each case is rotatably and axially supported on a partition portion of the mutually adjacent cases, said output shaft is provided in the case arranged at one end of said plurality of combinations of connected cases, and said axial centers of two idler flanges in each case or said axial centers of both said idler flange and said output flange are arranged to be symmetrical in rotation to said axial center line of each said cylinder of each of the combinations.

* * * * *